Patented Dec. 9, 1924.

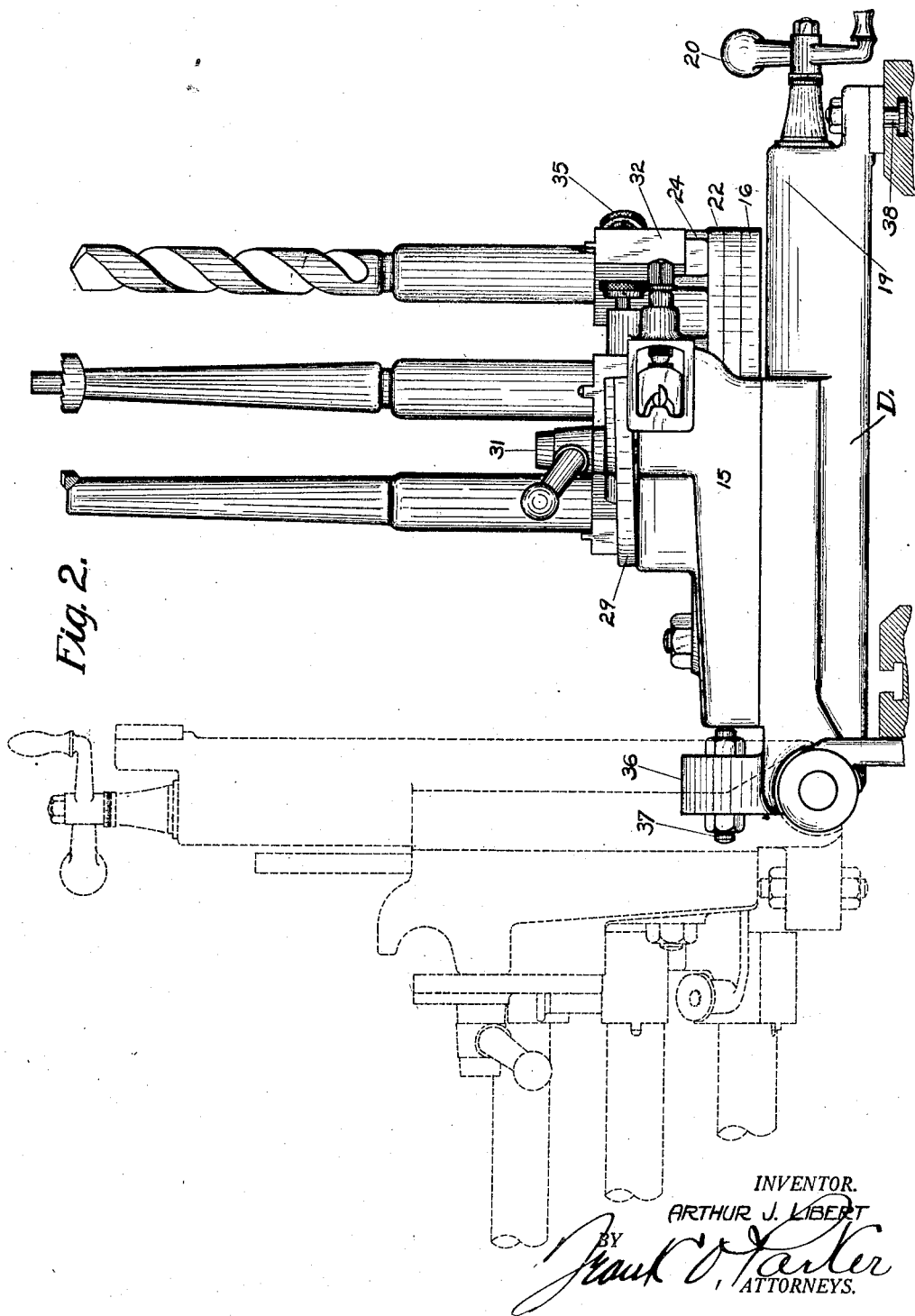

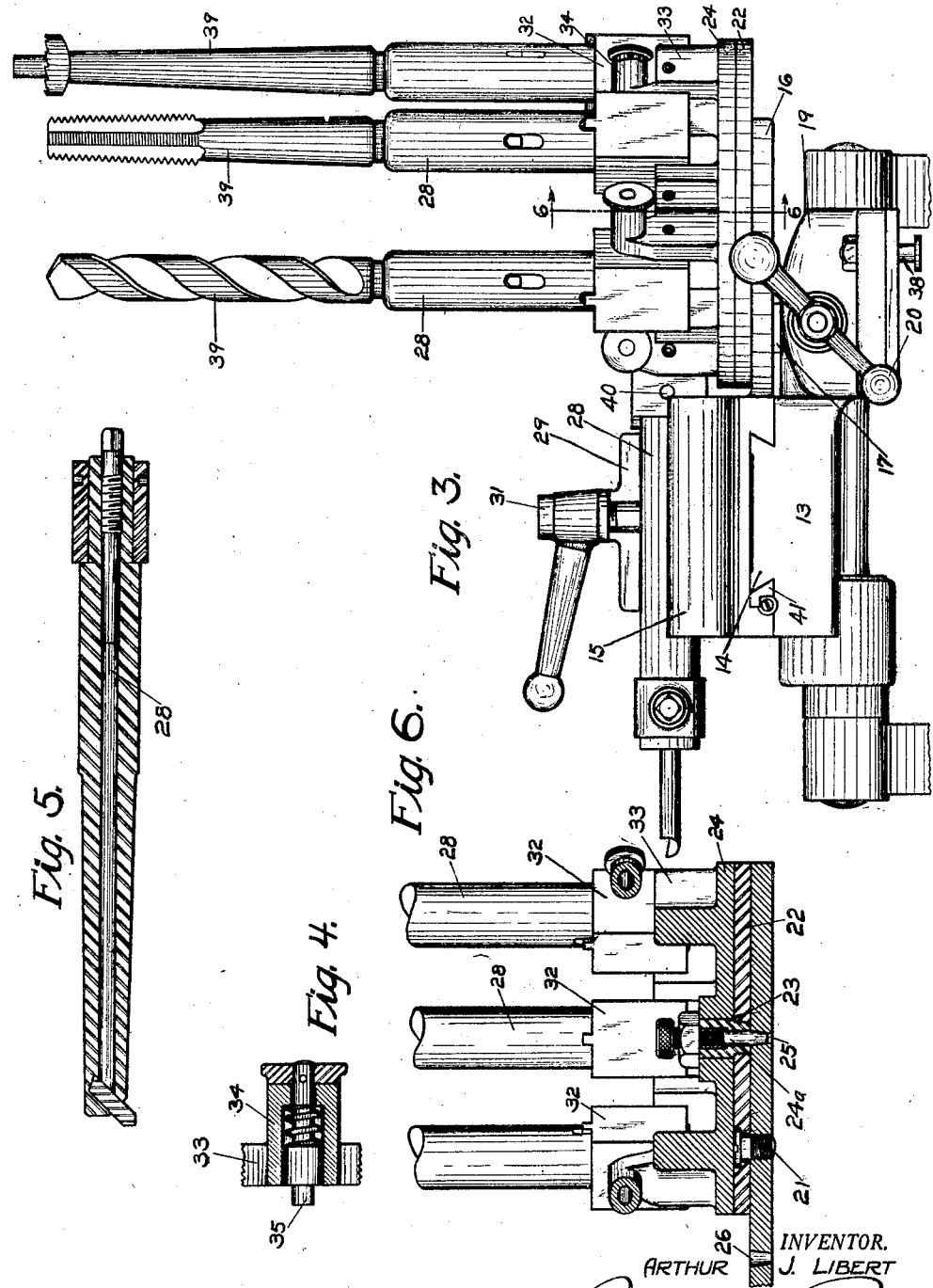

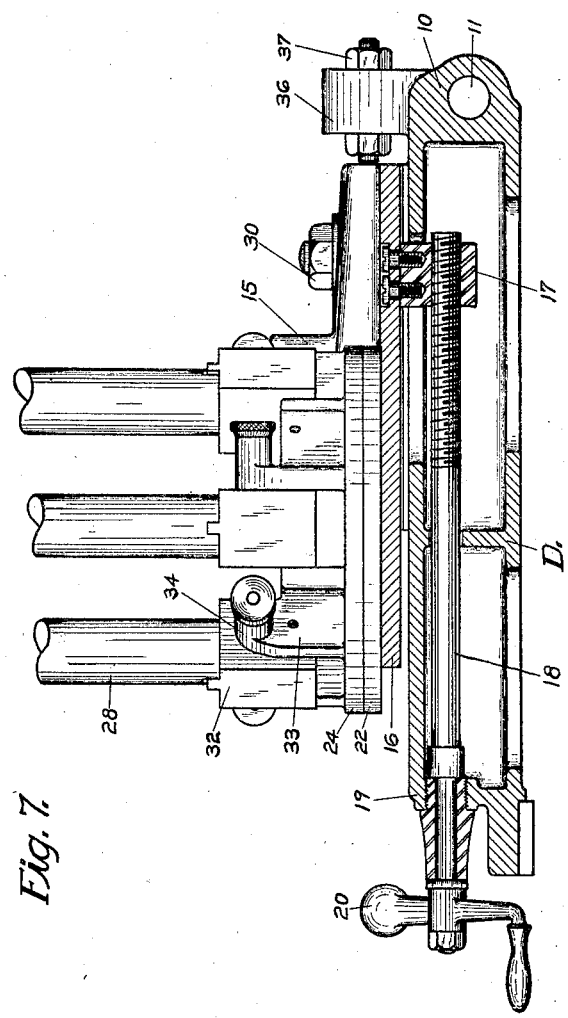

1,518,156

UNITED STATES PATENT OFFICE.

ARTHUR J. LIBERT, OF GREEN BAY, WISCONSIN.

TURRET ATTACHMENT FOR LATHES.

Application filed September 18, 1923. Serial No. 663,368.

*To all whom it may concern:*

Be it known that I, ARTHUR J. LIBERT, a citizen of the United States, residing at Green Bay, in the county of Brown and State of Wisconsin, have invented certain new and useful Improvements in Turret Attachments for Lathes, of which the following is a specification.

The invention relates to a turret for lathe machines, and more particularly to the class of adjustable turrets for use with all types of lathes.

The primary object of the invention is the provision of a turret of this character, wherein the same is fitted with a rotatable tool holder, so that any particular tool can be brought into working position relative to the lathe, and such tool firmly clamped in working position, the carriage for the turret being of novel form, and being fed longitudinally of the said lathe in the usual manner.

Another object of the invention is the provision of a turret of this character, wherein the tool holder can be swung away from the carriage when the work has been completed, and said holder accommodates a variety of tools adaptable for use upon the lathe, the tools being detachably and adjustably mounted in a novel manner.

A further object of the invention is the provision of a turret of this character, wherein the same is of novel form so that when not in use it can be shifted out of the way, and the ordinary tool holder or post on the carriage of the lathe used.

A still further object of the invention is the provision of a turret of this character, wherein economy in labor is attained, as it eliminates the fitting of the different tools, for the reason that the various tools are mounted upon the turret and can be conveniently swung into position for use.

A still further object of the invention is the provision of a turret of this character, which is extremely simple in construction, readily and easily mounted upon the carriage of the lathe, thoroughly reliable and efficient in its use, strong, durable, and inexpensive in manufacture and installation.

With these and other objects in view the invention consists in the features of construction, combination and arrangement of parts as will be hereinafter fully described, illustrated in the accompanying drawings, and pointed out in the claims hereunto appended.

In the accompanying drawings:

Figure 2, is a side elevation, showing the full lines the turret in working position upon the lathe, and by dotted lines the turret in inoperative position.

Figure 3, is a front elevation of the turret.

Figure 4, is a detail sectional view through one of the locking devices for a tool mount.

Figure 5, is a longitudinal sectional view through one of the tool mounts.

Figure 6, is a vertical sectional view on the line 6—6 of Figure 3.

Figure 7, is a sectional view on the line 7—7 of Fig. 1 looking in the direction of the arrows.

Similar reference characters indicate corresponding parts throughout the several views in the drawings.

Figure 1:
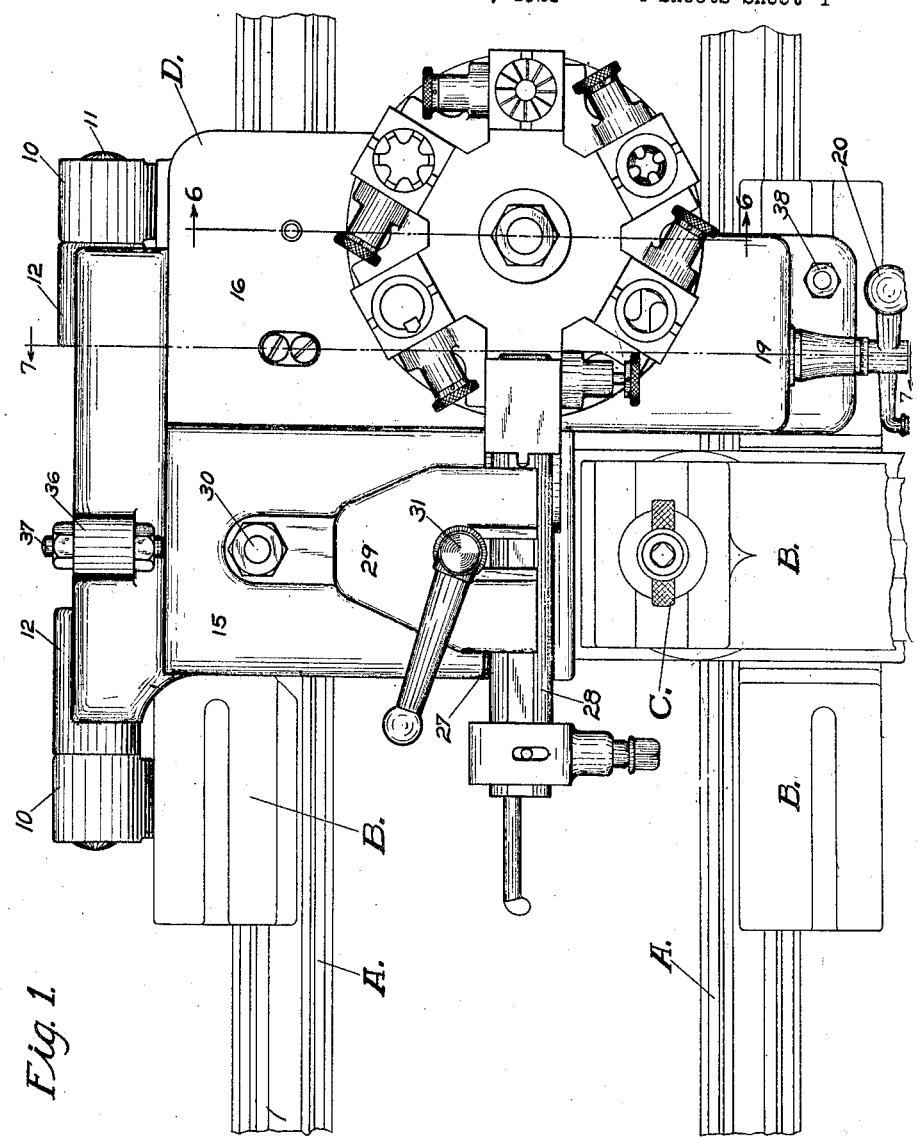
Figure 1, is a fragmentary plan view of a lathe bed, showing the carriage and the turret mounted upon the latter constructed in accordance with the invention.

Referring to the drawings in detail, A, designates generally a portion of the bed of a lathe, which latter may be of any ordinary construction, and B, the carriage which is adapted to travel longitudinally of the bed A, in the usual manner, the carriage B, being fitted with the ordinary tool post C.

Arranged at one side of the carriage B, are spaced pintle eyes 10, for receiving a pintle 11, which is also received in pintle sleeves 12, formed on the turret attachment D, hereinafter fully described.

The turret attachment D, comprises a base plate 13, which is adapted to swing vertically upon the pintle 11, from horizontal working position to upright inoperative position, the sleeves 12, being formed on the base plate 13, at one edge thereof. Formed on the base plate 13, transversely relative to the bed A, of the lathe, is a guide rib 14, of dove-tail shape to which is slidably fitted a saddle 15, having formed thereon an overhanging portion 16, relative to the base plate 13, constituting a platform to the under side of which is fitted a nut 17, having threaded therein an adjusting screw 18, which is journaled in the raised portion 19, of the base plate 13, and terminates exteriorly thereof in a handle or lever 20, for manually actuating the screw 18, for moving the saddle 15, in the adjustment thereof as will be apparent.

Eccentrically connected to the platform 16, at 21, which is in the form of a countersunk screw, is a swinging table 22, having fitted centrally therein a pivot stud 23, to which is rotatably fitted a turntable tool holder 24, the stud 23, being fitted with a latch pin 24, engageable in either of the holes 25 and 26 respectively, so as to lock the holder 24, in two positions.

Formed in the upper face of the saddle 15, near the front end thereof is a tool seat 27, for receiving each tool holder 28, which latter is held firm in the seat through the medium of a clamp plate 29, swingingly fastened at 30, to the saddle 15, and locked by the handle nut 31. The holders 28, are removably fitted upon tilting blocks 32, each being pivoted in bearings 33, formed on and rising from the turn table 24, one of each pair being provided with a locking pin housing 34, in which is fitted a spring held locking pin 35, for locking each block 32, upright to normally hold the holder 28, and its tool fitted therein in vertical position when not in use.

Mounted in a boss 36, on the base plate 13, is an adjustable stop 37, for limiting the movement of the saddle 15, in one direction as will be apparent. The base plate 13, is fastened in horizontal position by a bolt and nut fastener 38, detachably engaged in the carriage B, in the manner as shown in Figures 1 and 3, of the drawings.

Normally the tools 39, engaged in the holders 28, are in raised position shown in Figure 3, of the drawings, these being locked in such position through the medium of the pins 35, which engage in recesses 40, formed in the blocks 32, and when the turret D, is not in use the same is swung to the position shown by dotted lines in Figure 2, of the drawings, while the working position of said turret is shown by full lines in said Figure 2, of the drawings.

The tool holders 28, are detachably engaged upon the blocks 32, so that the same can be readily removed as the occasion may require, and particularly when changing the tools.

When the base plate 13, is in lowered position on the cariage B, of the lathe, and locked by the fastener 38, the saddle 15, can be adjusted by turning the handle 20, to bring the turret in or out for the use of the tools for boring or facing. Now, if it be desired to use the tool post C, on the carriage B, the table 22, can be released by the latch pin 24, and then swung eccentrically on the platform 16, rearwardly of the lathe to be disposed out of the way, and in this position can be latched by engaging the pin 24, in the hole 26, in said platform of the saddle 15, on the base plate 13, of the turret.

On selecting the desired tool for use on the turret D, the locking pin 35, holding its holding 28, in vertical position is released and thereupon the said tool falls into the seat 27, on the saddle, which seat has previously been uncovered by the clamping plate 29, for receiving said chuck, and thereafter the clamping plate is brought into position for firmly holding the tool and holder in working position. The tools are selected by rotating the turn table 24, as will be obvious.

The stop 37, at the back of the turret enables the saddle to be shifted on adjustment thereof by the screw 18, for contact with the stop to bring the tools centrally of the lathe, and in this manner it obviates the operator measuring each time for the center of said lathe.

Arranged between the guide rib 14, and the saddle 15, is a gib key 41, for taking up the play between the said saddle and base plate 13.

Having thus described the invention, what is claimed is:

1. A turret attachment for lathes, comprising a base plate adapted to be connected to a carriage of the lathe for vertical swinging movement, a saddle slidably fitted upon the base plate, and having a platform, a rotatable turn table on the platform, a plurality of tool holders concentrically arranged upon the table, and each adapted to swing from normal vertical position to horizontal working position onto the saddle, means for fastening the tool holder on the saddle, and means for locking the tool holders in raised vertical position.

2. A turret attachment for a lathe, comprising a base plate adapted to be connected to a carriage of the lathe for vertical swinging movement, a saddle slidably fitted upon the base plate, and having a platform, a rotatable turn table on the platform, a plurality of tool holders concentrically arranged upon the turn table, and each adapted to swing from normal vertical position to horizontal working position onto the saddle, means for fastening the tool holder on the saddle, means for locking the tool holders in raised vertical position, and means for adjusting the saddle.

3. A turret attachment for a lathe, comprising a base plate adapted to be connected to a carriage of the lathe for vertical swinging movement, a saddle slidably fitted upon the base plate, and having a platform, a rotatable turn table on the platform, a plurality of tool holders concentrically arranged upon the turn table, and each adapted to swing from normal vertical position to horizontal working position onto the saddle, means for locking the tool holder on the saddle, means for locking the tool holders in raised vertical position, means for adjusting the saddle, and means permitting the turn table to be swung eccentrically on the platform.

4. A turret attachment for a lathe, comprising a base plate, adapted to be connected to a carriage of the lathe for vertical swinging movement, a saddle slidably fitted upon the base plate, and having a platform, a table, and each adapted to swing from normal vertical position to horizontal working position onto the saddle, means for locking the tool holder on the saddle, means for locking the tool holders in raised vertical position, means for adjusting the saddle, means permitting the turn table to be swung eccentrically on the platform, and an adjustable stop on the base plate to limit the movement of the saddle in one direction.

5. A turret attachment for a lathe, comprising a base plate adapted to be connected to a carraige of the lathe for vertical swinging movement, a saddle slidably fitted upon the base plate, and having a platform, a rotatable turn table on the platform, a plurality of tool holders arranged upon the turn table, and each adapted to swing from normal vertical position to horizontal working position onto the saddle, means for locking the tool holder on the saddle, means for locking the tool holders in raised vertical position, means for adjusting the saddle, means permitting the turn table to be swung eccentrically on the platform, an adjustable stop on the base plate to limit the movement of the saddle in one direction, and means for fastening the base plate when lowered to the carraige.

In testimony whereof I affix my signature.

ARTHUR J. LIBERT.